(12) United States Patent
Amey et al.

(10) Patent No.: US 6,677,484 B1
(45) Date of Patent: Jan. 13, 2004

(54) MELT-SPRAYED CURING AGENT POWDER AND POWDER COATING COMPOSITIONS MADE THEREFROM

(75) Inventors: Ronald Lee Amey, Wilmington, DE (US); George Alan Schurr, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 183 days.

(21) Appl. No.: 09/628,993

(22) Filed: Jul. 31, 2000

(51) Int. Cl.$^7$ .............. C09D 5/03; C07C 55/02; C07C 55/18; C07C 55/20; C07G 55/21
(52) U.S. Cl. .............. 562/590; 252/1; 264/12; 524/321; 524/904
(58) Field of Search ................ 524/904, 321; 525/327.3, 386; 562/590; 252/1; 264/12

(56) References Cited

U.S. PATENT DOCUMENTS

| | | | |
|---|---|---|---|
| 5,455,290 A | 10/1995 | Kitagawa et al. | 523/443 |
| 5,461,089 A | * 10/1995 | Handyside et al. | 264/12 |
| 5,468,813 A | 11/1995 | Uenaka et al. | 525/385 |
| 5,498,479 A | 3/1996 | Nishida et al. | 428/403 |
| 5,708,039 A | 1/1998 | Daly et al. | 521/61 |
| 5,800,923 A | * 9/1998 | Amey et al. | 428/407 |

FOREIGN PATENT DOCUMENTS

| | | |
|---|---|---|
| EP | 0 687 714 B1 | 5/1999 |
| EP | 0 678 564 B1 | 7/1999 |
| WO | WO 92/00342 | 1/1992 |
| WO | WO 98/36011 | 8/1998 |

OTHER PUBLICATIONS

Richard L. Snow, Terry Allen, Bryan J. Ennis, and James D. Litster, Size Reduction and Size Enlargement, *Perry's Chemical Engineers' Handbook, 7th Edition*, 20–80 to 20–81, 1997.

* cited by examiner

*Primary Examiner*—Kelechi C. Egwim
(74) *Attorney, Agent, or Firm*—Gerald E. Deitch

(57) ABSTRACT

Powder comprising substantially spherical particles of at least one compound selected from the group consisting of azelaic acid, sebacic acid, undecanedioic acid, dodecanedioic acid, brassylic acid, and the anhydrides of said acids, said at least one compound being distributed substantially uniformly throughout the entirety of each of said particles, said particles having a particle size distribution as follows:

$$\frac{d90 - d10}{d50} < 1.90$$

wherein:
d50 is a particle diameter at which 50% of the particles have diameters which are greater or smaller than the d50 value;
d90 is a particle diameter at which 90% of the particles have diameters which are smaller than the d90 value;
d10 is the particle diameter at which 10% of the particles have diameters which are smaller than the d10 value; and
d50 is 8 to 30 micrometers.

2 Claims, 3 Drawing Sheets

MELT-SPRAYED CURING AGENT POWDER AND POWDER COATING COMPOSITIONS MADE THEREFROM

BACKGROUND OF THE INVENTION

Powder coating compositions (dry coatings which do not contain water or organic solvents) can be produced by (1) dry blending or mixing a thermosetting base resin, a curing agent (also referred to as a cross-linker), and other additives which may include, but are not limited to, pigments, adhesion modifiers, flow modifiers, degassing agents, ultraviolet light stabilizers or absorbers, slip agents, catalysts, anti-mar agents, etc., (2) melting and kneading the mixture, as for example in a twin-screw extruder, under conditions such that cross-linking of the base resin does not occur, (3) grinding or pulverizing the extrudate to produce a powder, and (4) classifying the powder on the basis of size to produce the powder coating composition. A powder coating composition so made can then be applied to a substrate such as an electrical appliance, automotive part, etc., by electrostatic spray methods or fluidized bed dipping processes and then baked to give a coating film. The various ingredients which make up the dry blend may also be ground or pulverized before dry blending or mixing to improve the blending or mixing process.

EP 678564 discloses a formulated powder coating composition comprising particles of a binder resin and a hardener, which particles have a specified size and an external additive on their surface.

WO 98/36011 discloses polyester particles having mean particle size less than 50 micrometers. The polyester particles are taught to be uniformly colored and spherical and have a monomodal particle size distribution where d90-d10/d50 is less than or equal to 2.5. The particles can be melted at less than 200° C. to form a continuous coating.

U.S. Pat. No. 5,708,039 discloses a formulated powder coating composition of generally spherical particles and of a specified particle size produced by dissolving the ingredients making up the particles in a supercritical fluid and spraying, wherein about 96% by volume of the powder coating particles have a size about 20 micrometers or less.

U.S. Pat. No. 5,498,479 discloses powder coating composition with specified particle size requirements, as well as an external additive attached to the surface of the particles.

EP 687714 discloses a formulated powder coating composition in which the average particle diameter is 20 to 50 micrometers and standard deviation of the particle size distribution is not greater than 20 micrometers. The powder coating is sized by grinding and then classifying.

U.S. Pat. No. 5,468,813 discloses a powder coating composition in which particles of a curing agent have an average particle size of 0.3 to 7 micrometers. Curing agent particles having a particle size not smaller than 20 micrometers account for not more than 10% by weight of all the curing agent particles. The curing agent characteristics are attained by adjusting the particle size by grinding of the curing agent. The patent discloses that when the average particle size is greater than 7 micrometers, the state of mixing of the binder resin and curing agent becomes poor, and coating films with good smoothness can no longer be obtained.

U.S. Pat. No. 5,455,290 discloses a thermosetting epoxy resin-based powder composition which contains a high melting polycarboxylic anhydride in the form of fine particles 5 to 149 micrometers in average size with calcium silicate as a filler. The anhydride cross-linker has a specified size, but the particle size distribution is broad, the particles are not spherical. The patent does not teach how to prepare the particles.

WO 92/00342 discloses a process for making a thermosetting powder coating composition comprising forming a molten mixture of polymer, a curing agent, and optional coloring agent, atomizing the melt into droplets and cooling to form solid powder particles. The patent application discloses narrow particle size distribution with spherical particles prepared by rotary atomization, 2-fluid atomization, etc.

General discussions of spray-drying, melt spraying (prilling), and atomization can be found in the following: Size Reduction and Size Enlargement, Chapter 20, 20–80 and 20–81, R. L. Snow, T. Allen, B. J. Ennis, J. D. Litster, Perry's Chemical Engineers Handbook, Seventh Edition, R. H. Perry, D. W. Green, J. O. Maloney, Eds., McGraw-Hill, N.Y., 1997 and references contain therein.

Common glycidyl methacrylate (GMA) acrylic powder coating compositions contain a glycidyl-functional cross-linkable base resin, a curing agent which is an acid-functional cross-linker containing at least two carboxylic acid groups, as well as one or more of the additives described above. Common acid functional cross-linkers include, among others, dodecanedioic acid (DDDA) and its anhydride.

DDDA flakes are produced commercially by use of a chilled roll flaker, in which molten DDDA is coated on a chilled, rotating drum and scraped off therefrom with a blade. Abrasion of the flaker blade can result in small fibers and blade particles being trapped in the resulting DDDA flakes. The use of such flakes to make a powder coating composition can result in unacceptably rough and marred coating finishes, a particular problem for automotive clearcoat applications.

Flakes of DDDA (and crystals of other curing agents) are sometimes ground or milled into smaller particles which are often angular, jagged and irregular, and thus mix or blend inefficiently with a base resin during the dry blending or mixing step in preparing a powder coating composition. Such particles also disperse inefficiently during the extrusion step in preparing a powder coating composition, resulting in inefficient use of energy to operate the extruder, increased cycle times for the extruder and nonuniformity in the extrudate prior to grinding it.

Often the curing agent and each of the additives which are used to make a coating composition are separately ground before being dry mixed or blended with each other and the base resin to make the powder coating composition. Such compositions generally cannot contain liquid additives and generally produce final coatings which have limited flow-out, smoothness, gloss and "distinctness of image" (DOI) .

There is a need in the art for curing agent particles which are not made using a flaker, which are not angular, jagged or irregular, which can be mixed or blended efficiently during the dry blending or mixing step of powder coating composition production, which can disperse efficiently during the extrusion step of powder coating composition production, which impart good flow-out, smoothness, gloss and DOI to coatings, which allow for incorporation of liquid additives, and which allow for the production of masterbatches of single particles which contain both cross-linking agent and additives. The present invention satisfies these needs.

BRIEF SUMMARY OF THE INVENTION

In its broadest aspect, the present invention is a curing agent powder comprising substantially spherical particles of at least one compound selected from the group consisting of azelaic acid, sebacic acid, undecanedioic acid, dodecanedioic acid, brassylic acid, and the anhydrides of said acids, said particles having a particle size distribution as follows:

$$\frac{d90 - d10}{d50} < 1.90$$

wherein:
 d50 is a particle diameter at which 50% of the particles have diameters which are greater or smaller than the d50 value;
 d90 is a particle diameter at which 90% of the particles have diameters which are smaller than the d90 value;
 d10 is the particle diameter at which 10% of the particles have diameters which are smaller than the d10 value; and
 d50 is 8 to 30 micrometers, with 10 to 25 micrometers being preferred and 10 to 20 micrometers being most preferred.

In a second aspect, the present invention is a powder coating composition comprising the curing agent powder, above, and a cross-linkable base resin.

In a third aspect, the present invention is a process for making a curing agent powder comprising spraying a molten curing agent comprising at least one compound selected from the group consisting of azelaic acid, sebacic acid, undecanedioic acid, dodecanedioic acid, brassylic acid, and the anhydrides of said acids, from a nozzle into a walled chamber to form a spray comprising droplets of said curing agent, said chamber being sized to allow said droplets to solidify before they contact the wall of said chamber.

Because the spherical particles of the present invention are not made using a flaker, they are not subject to contamination with flaker blade material.

The spherical particles of the present invention mix or blend more efficiently during the dry blending step in the production of powder coating compositions than particles produced by grinding or jet milling which are angular, jagged, and irregular.

The spherical particles of the present invention disperse more efficiently than irregular particles during the extrusion step in the production of powder coating compositions, which reduces the energy required for operation of the extruder, reduces the cycle time of the extrusion, and gives a more uniform extrudate prior to grinding.

Powder coating compositions which contain the spherical particles of the present invention give, after baking and cooling, final coatings with better flow-out, better smoothness, better gloss, and better distinctness of image (DOI) than can be obtained from otherwise comparable compositions made using irregular particles.

The present invention allows the incorporation of liquid materials into the coating compositions without the need for separate carrier particles coated with the liquid materials.

The present invention allows the production of so-called masterbatches of single particles containing both curing agent and additives, thereby eliminating the need to grind separately the curing agent and each of the additives, thereby resulting in energy and cost savings in the manufacturing process used to make powder coating compositions.

DESCRIPTION OF THE DRAWING

The drawing consists of three figures.

DETAILED DESCRIPTION OF THE INVENTION

The curing agent powder of the present invention can be produced by melt spraying, also called "prilling" or "fluid atomization." This method of preparation allows the incorporation into the curing agent powder of materials, such as liquids, which cannot otherwise be added to powder coating compositions without destroying or significantly reducing the composition's coating properties. According to the prior art, acrylic flow modifiers, which are liquids, are normally adsorbed onto colloidal silica particles so that they can be readily added to powder coating compositions without causing gumming, sticking or agglomeration of the latter. However, the presence of the colloidal silica often results in cloudiness or opacity in unpigmented, clear coatings, an undesirable result for automotive applications. In contrast, the present invention allows, for example, 10% by weight of a liquid acrylic flow modifier to be incorporated directly into the spherical particles of the present curing agent powder. Use of the resulting particle eliminates the need for a colloidal silica carrier in the coating composition and thus eliminates the potential for cloudiness in the clear coating. Other additives can also be incorporated into the curing agent powder to provide a masterbatch which is easily incorporated into a powder coating composition, thereby imparting significant improvements to the final coating.

The melt spraying of the present curing agent particles consists of spraying droplets of molten curing agent liquid into a collection chamber (or tower) and allowing the droplets to solidify into spherical particles before they contact the walls of the collection chamber. A discussion on the fundamentals of prilling of generally larger particles is taught in Perry's Chemical Engineers' Handbook. Prilling may be done using a single-fluid or, more preferably, a 2-fluid nozzle. Such nozzles are commercially available from companies such as Spraying Systems Co., Wheaton, Ill., U.S.A. The collection chamber is sized according to the properties of the material being atomized, so that the temperature of the particle falls below the melting point before the particles contact the surface of the collection chamber. Generally the collection chamber will be attached to a gas/solid separator or cyclone in order to disengage the solid particles from the air, nitrogen, or other gas used in the collection chamber and/or in the 2-fluid nozzle.

Figure 1:
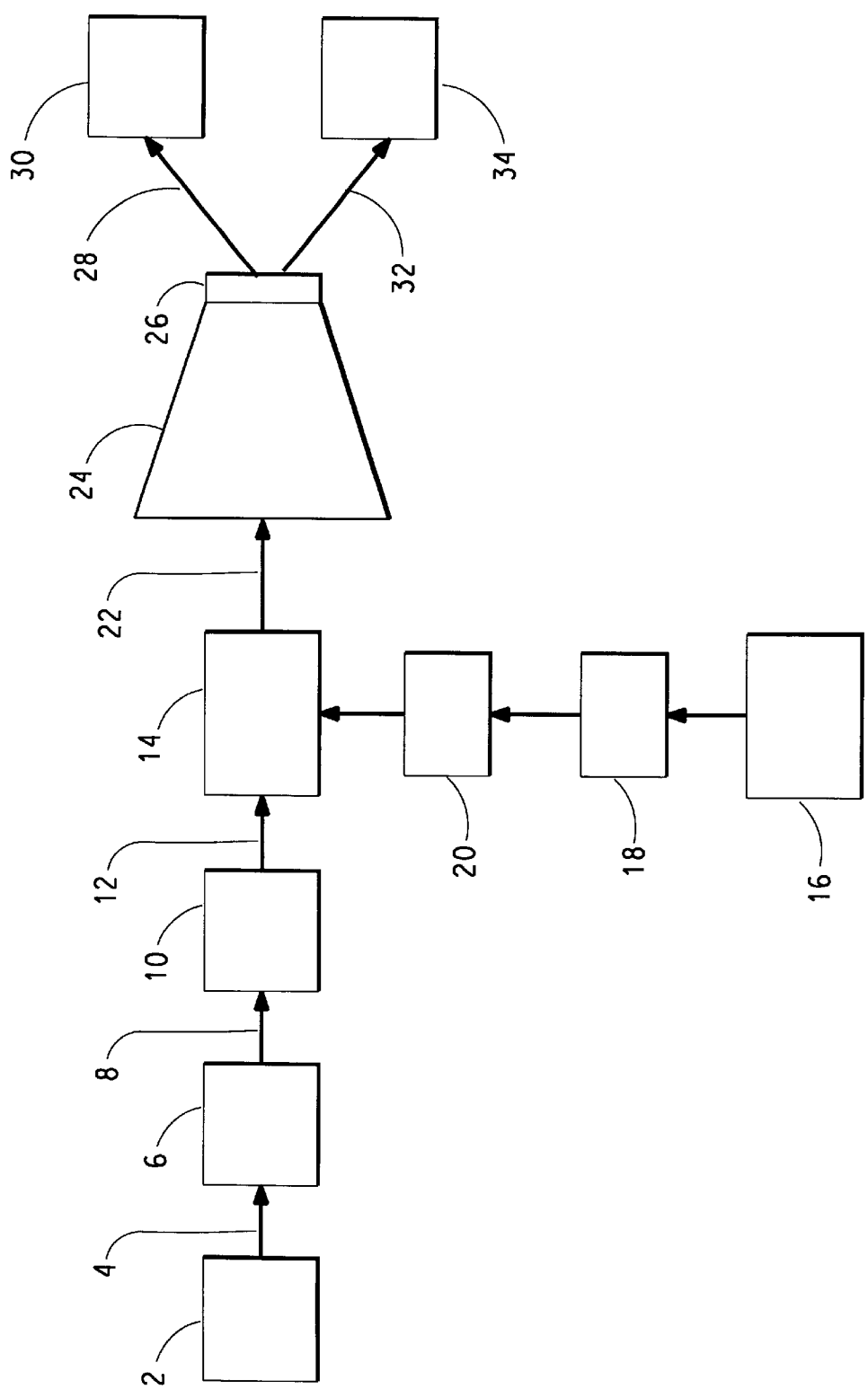
FIG. 1 is a block diagram depicting a melt spraying apparatus for producing powder of the present invention.
Figure 2A:
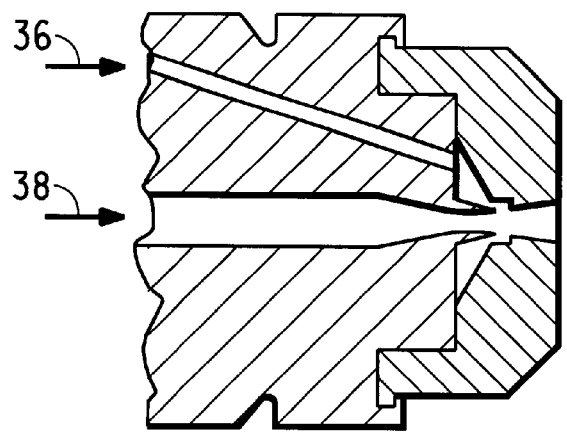
FIGS. 2a and 2b depict cross-sections of spray nozzles used for producing powder of the present invention.
Figure 2B:
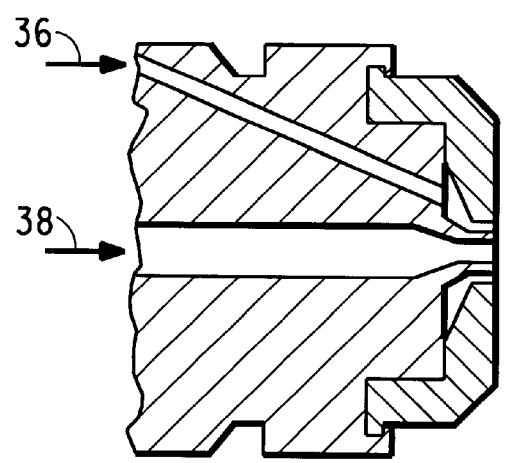
Figure 3A:
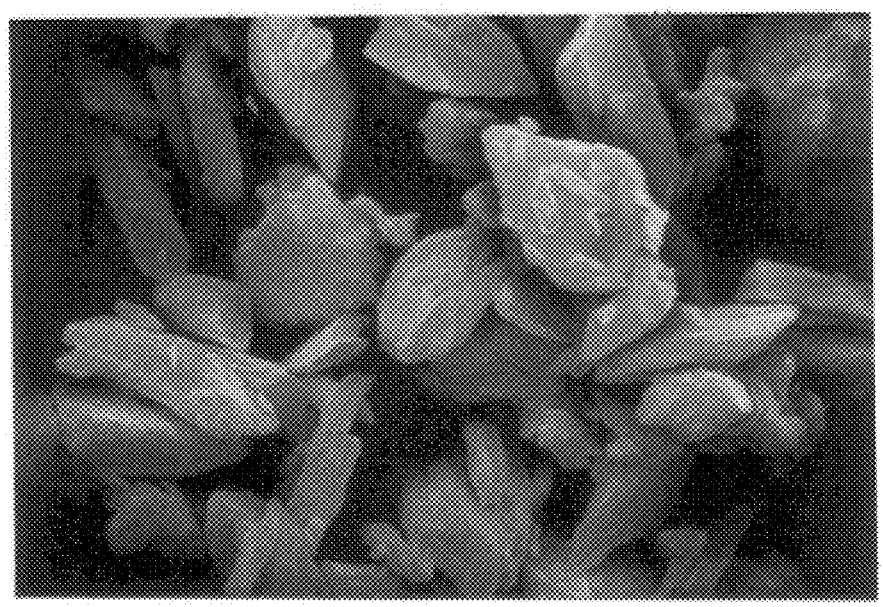
FIG. 3a is a scanning electron photomicrograph of DDDA particles made by a prior art process.
Figure 3B:
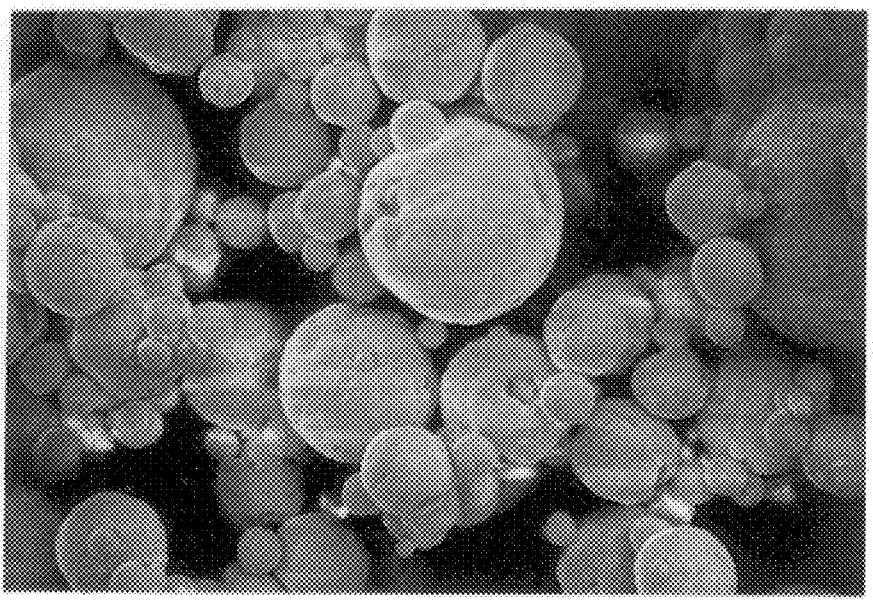
FIG. 3b is a scanning electron photomicrograph of DDDA particles made in accordance with the present invention.

Referring now to the drawing, there is shown in FIG. 1 a block diagram depicting the unit operations of a typical melt-spraying apparatus. Curing agent ("CA") flakes in container 2 are fed by line 4 to melt tank 6 where the CA is melted and stirred. The type of heater used to melt the CA is not critical. Usually, an external heating jacket is employed. Inside melt tank 6 is a stirrer, not shown. The molten CA is fed by a heated line 8 to a heated, positive displacement pump 10, which passes the molten CA through heated line 12 to spray nozzle 14. Spray nozzle 14 may be a 2-fluid nozzle (also called a twin-fluid nozzle) in which heated air 36 is mixed with molten CA 38, either internally, as shown in FIG. 2a, or externally, as shown in FIG. 2b. A source of compressed air 16 is used to pass air through a flow meter and flow gauge 18 into an in-line heater 20, in which the air is heated. The heated air is then introduced into spray nozzle 14. Spray nozzle 14 introduces a spray of molten CA, not shown, into a collection chamber 24. The chamber is generally in the shape of a horn, although shape is not critical. If a horn shape is used, the length of the horn, front to back should be at least 3 times the diameter of the horn opening. At the back of the horn there is disposed a cyclone 26, which is used to separate CA particles which have formed in the collection chamber from gases. The gases are passed through line 28 into a filter 30, after which the gases may be released into the air. The particles of CA which have been formed in the collection chamber and separated in the cyclone are passed through line 32 into a collection bag 34.

The following process parameters are important for achieving curing agent powder in accordance with the present invention:

Viscosity of the molten feed material at the feed temperature: The viscosity of the molten CA in the melt tank 6 should be less than or equal to 100 centipoise (cP). For example, molten DDDA has a viscosity of approx. 12–15 cP at 150 C; the DDDA polyanhydride has a viscosity of about 77 cP at 100 C.

Melt viscosity can be determined in advance of melt spraying using the following protocol. A Brookfield LVF viscometer with SC4-18/13R utility cup and spindle is connected to a VWR model 1136 circulating hot oil bath. A powdered sample is loaded into the hot sample cup containing the disconnected spindle. Extra powder is added to make up for volume change as the sample melts. Sample temperature is monitored by a thermocouple immersed carefully to avoid contact with the cup sidewall. When the sample reaches and holds 2 minutes at temperature the thermocouple is removed, the spindle is connected, and viscosity measurements at 6, 12, 30 and 60 RPM are made. Results are reported in centipoise.

Temperature of the molten feed material: (This is the temperature of the material in the feed tank 6 and feed lines 8 and 12 before the spray nozzle 14.) The temperature of the feed material should be at least 20 degrees higher than the feed material melting point. However, the temperature of the molten feed material should not be so high that decomposition (for example, decarboxylation), discoloration, etc. of the feed occurs. This upper temperature limit will vary depending on the specific acid or anhydride feed that is used. Generally the molten feed temperature should not be more than 75 degrees higher than the melting point to avoid the discoloration problem which, if it occurs, will usually do so at temperatures lower than decomposition.

Air temperature at the nozzle: Temperature of air at the nozzle 14 should generally be about 35 to 135 degrees higher than the temperature of the molten feed material. Usually 40–75 degrees higher than the temperature of the molten feed material is preferred.

Air flow rate at the nozzle: Air flow rate at the nozzle 14 generally should be about 350–500 scfh (standard cubic feet per hour). 420–490 scfh is preferred for production of particles at the lower end of the d50 range, that is, about 10 microns. 350–400 scfh produces particles in the 20–30 micron range. Below about 350 scfh produces unacceptably large, non-spherical particles, while flows above about 500 scfh produce unacceptably small particles. Air flow rate is adjusted using flow meter and flow gauge 18.

The present powder coating compositions contains an acrylic resin (cross-linkable base resin), the present curing agent powder, and may also contain one or more additives. The additives may be incorporated into the curing agent particles or may be added separately during manufacture of the powder coating composition.

The preferred GMA-acrylic resins (cross-linkable base resins) for the powder coating composition are copolymers of alkyl acrylates and/or alkyl methacrylates with glycidyl methacrylates and/or glycidyl acrylates and olefinic monomers such as styrene. Glycidyl-functional acrylic resins (so-called GMA acrylic resins) are sold, for example, by Anderson Development Co. (A subsidiary of Mistui Toatsu Chemicals, Inc.) under the trademark ALMATEX (e.g., PD-7610, PD-6190, PD-7690, etc.).

The acid functional cross-linkers may be selected from the group consisting of azelaic acid, sebacic acid, undecanedioic acid, dodecanedioic acid, brassylic acid, and the anhydrides of said acids.

Additives suitable for inclusion into the powder coating compositions include adhesion modifiers, slip agents, antioxidants, light stabilizers (ultraviolet light absorbers), pigments, dyes, processing aids, flow modifiers, degassing agents, curing agent catalysts and anti-blocking agents. Examples of antioxidants include, but are not limited to, hindered phenols, phosphites, and propionates. Antioxidants are used in amounts from about 0.01 to about 2.0 weight percent of the powder. Light stabilizers and UV absorbers include, but are not limited to, hindered amine compounds, benzophenone stabilizers, salicylates, benzotriazoles, etc. Examples of anti-blocking agents (dry flow agents) include fumed silica, clay, talc, fumed alumina, and precipitated silica. Flow modifiers are typically low molecular weight acrylic resins to improve flow-out and leveling of the coating. Examples include Modaflow 2100 (Solutia Inc., St. Louis, Mo., USA) and Resiflow P-67 (Estron Chemical, Inc., Calvert City, Ky., USA). Degassing agents include compounds such as benzoin. Adhesion modifiers include epoxy resins such as epichlorohydrin-bisphenol condensates and triglycidyl isocyanurate. Pigments may be inorganic or organic. Curing agent catalysts include various organic tin derivatives, imidazoles, triphenylphosphine, tertiary amines, tetraalkylammonium salts, etc.

Additives suitable for inclusion into prilled masterbatch particles of this invention include the same compounds as described above. Solid additives must be able to be melted in order to incorporate them into the molten curing agent prior to melt spraying. Liquid additives may be incorporated directly into the molten curing agent prior to melt spraying.

Curing agent powder compositions in accordance with the present invention can be evaluated for particle shape and size distribution as follows. Particle size and particle size distribution are determined using a Horiba Inc. model LA-500 or LA-910 particle size analyzer. The sample, typically 2–3 mg, is mixed in 10 mL of deionized water with 0.03 g Silwet® 7614 wetting agent (Registered trademark of Solutia Inc.). The sample mix is dispersed with a Misonix XL ultrasonic sonicator for 1 minute (dial setting=4), then placed in the analyzer cell filled with a mixture of the water/wetting agent as above. A minimum of two measurements on the sample are taken to obtain values for d50, d90, d10.

Separately, a sample is prepared for scanning electron microscopy in a Hitachi S4000 field emission scanning electron microscope (SEM) by dispersing the sample onto a carbon mount, sputter-coating the sample with elemental gold, and then collecting the secondary electron images with the SEM instrument. SEM images are visually reviewed to estimate the number of non-spherical particles, if any, and to estimate the particles' sphericity (approach of the particle to being substantially spherical in shape).

Powder coating compositions can be made by processes well known in the art. The most general process comprises mixing of the raw materials, extruding the mixture through an appropriate extrusion device, grinding or pulverizing the cooled extrudate and then classifying the ground mixture to collect the appropriate particle size.

Application of the powder coating composition to a surface to be coated is not limited by any particular method, but includes any of the known conventional application techniques including electrostatic spray methods, fluidized dipping methods, etc.

EXAMPLES

In the examples that follow, the melt-spraying was accomplished using a 2-fluid nozzle made by Spraying Systems Co., Wheaton, Ill., U.S.A., ¼ J nozzle body, fluid cap 100150SS, open solid air cap with full round spray pattern, with ¼" internal diameter and ⅝" long tube.

Example 1

Addition of Liquid Flow Modifier to Dodecanedioic Acid

A 50 lb. bag of dodecanedioic acid (DDDA) flake was loaded to a stainless steel melt tank and slowly brought up to process temperature of 157° C. under a nitrogen sweep to exclude air. 10 wt. % of Modaflow 2100 (a liquid acrylic flow modifier; registered trademark of Solutia, Inc.) was added to the tank and allowed to mix. Molten feed from the tank was pumped to the 2-fluid spray nozzle using a Tuthill model DXS 1.3 pump. The 2-fluid spray nozzle uses heated air as the second fluid. Conditions at the spray nozzle were:

Air temperature=232° C.

Air pressure=30–40 psi

Air flow=350 scfh (standard cubic feet per hour)

Liquid flow (molten feed mixture)=50–60 pph (pounds per hour)

Molten feed leaving the spray nozzle was collected in a cyclone and the product analyzed by scanning electron microscopy (SEM) and particle size analysis prior to testing. The product is a white, free-flowing powder, average particle size, $d50=21.5$ micrometers and $[d90-d10]/d50=1.45$. The particles are spherical in contrast to the jagged, angular particles obtained by grinding DDDA in an Alpine pin mill.

Test of fine particle DDDA containing flow modifier:

| Component | Weight, grams. |
|---|---|
| Reference Formulation (DDDA not prilled) | |
| Almatex PD-7610 | 1092.0 |
| DDDA flake | 230.0 |
| Modaflow 2000 | 20.3 |
| Benzoin | 13.2 |
| Test Formulation: (DDDA prilled in accordance with invention) | |
| Almatex PD-7610 | 709.8 |
| DDDA prilled with 10% Modaflow 2100 (21 um particle size | 85.9 |
| DDDA prilled, no flow additive (25.8 um) | 63.6 |
| Benzoin | 8.6 |

Almatex PD-7610 is a standard GMA acrylic resin typically used in clearcoat applications for the automotive industry and is a registered trademark of the Anderson Development Co., Adrian, Mich. Modaflow 2000 is a liquid acrylic flow modifier adsorbed onto colloidal silica to create a free-flowing powder and is trademark of Solutia, Inc.

The dry blends were premixed twice for 30 minutes each in a Mixaco brand blender, then extruded through a 26:1 Prism 16 mm twin screw extruder at 125° C., cryogenically ground in a bantam mill and sieved through a 63 micrometer screen. The collected product was electrostatically sprayed onto panels coated with a black waterborne basecoat, then baked for 30 minutes at 150° C. Several coating thicknesses were tested for smoothness and appearance using a BYK Wavescan instrument.

Test Data: Comparison of single film thickness

| | R | S | L |
|---|---|---|---|
| Reference Formulation: (3.4 mil film thickness) | 8.7 | 5.1 | 14.8 |
| Fine Particle DDDA with Flow modifier: (3.8 mil film thickness) | 9.4 | 3.5 | 6.1 |

R value is calculated from S and L values and is a measure of orange peel or surface roughness; R=10 is perfectly smooth. S value is a measure of smoothness at short wavelength; lower values are better. L is a measure of smoothness at long wavelength and lower values are better.

The use of fine particle DDDA containing flow modifier is significantly better in terms of surface smoothness and visual appearance than use of flake DDDA with flow modifier added separately.

Example 2

Prilling of Dodecanedioic Acid (No additives)

A 160 lb. of DDDA flake was loaded in stages to a stainless steel melt tank and slowly brought up to process temperature of 157° C. under a nitrogen sweep to exclude air. Molten feed from the tank was pumped to the 2-fluid spray nozzle using a Tuthill model DXS 1.3 pump. The 2-fluid spray nozzle uses heated air as the second fluid. Conditions at the spray nozzle were:

Air temperature=205° C.

Air pressure=105 psi

Air flow=420 scfh

Liquid flow (molten feed mixture)=25.7 pph

Molten feed leaving the spray nozzle was collected in a cyclone and the product analyzed by SEM and particle size analysis prior to testing. The product is a white, free-flowing powder, average particle size, $d50=10.2$ um and $[d90-d10]/d50=1.25$. The particles are spherical.

Example 3

Demonstrating Prilling of Dodecanedioic Polyanhydride (No additives)

A 5 lb. charge of dodecanedioic polyanhydride powder was loaded to a stainless steel melt tank and slowly brought up to process temperature of 112 C under a $N_2$ sweep to exclude air. Molten feed from the tank was pumped to the 2-fluid spray nozzle using a Tuthill model DXS 1.3 pump. The 2-fluid spray nozzle uses heated air as the second fluid. Conditions at the spray nozzle were:

Air temperature=177 C

Air pressure=100 psi

Air flow=480–490 scfh

Liquid flow (molten feed mixture)=23.0 pph

Molten feed leaving the spray nozzle was collected in a cyclone and the product analyzed by SEM and particle size analysis prior to testing. The product is a white, free-flowing powder, average particle size, d50=17.4 um and [d90−d10]/d50=1.67. The particles are substantially spherical.

What is claimed:

1. Powder comprising substantially spherical particles of at least one compound selected from the group consisting of azelaic acid, sebacic acid, undecanedioic acid, dodecanedioic acid, brassylic acid, and the anhydrides of said acids, said at least one compound being distributed substantially uniformly throughout the entirety of each of said particles, said particles having a particle size distribution as follows:

$$\frac{d90 - d10}{d50} < 1.90$$

wherein:
- d50 is a particle diameter at which 50% of the particles have diameters which are greater or smaller than the d50 value;
- d90 is a particle diameter at which 90% of the particles have diameters which are smaller than the d90 value;
- d10 is the particle diameter at which 10% of the particles have diameters which are smaller than the d10 value; and d50 is 8 to 30 micrometers.

2. Powder as in claim 1, wherein said particles further comprise an additive selected form the group consisting of flow modifiers, pigments, degassing agents, adhesion modifiers, slip agents, and ultraviolet absorbers.

* * * * *